A. A. HORTON.
DRIVING APPARATUS FOR PHONOGRAPHS.
APPLICATION FILED OCT. 23, 1915.

1,205,631.

Patented Nov. 21, 1916.

INVENTOR
Allen A. Horton
by Raymond A. Parker
ATTORNEYS

UNITED STATES PATENT OFFICE.

ALLEN A. HORTON, OF DETROIT, MICHIGAN.

DRIVING APPARATUS FOR PHONOGRAPHS.

1,205,631.  Specification of Letters Patent.  Patented Nov. 21, 1916.

Application filed October 23, 1915. Serial No. 57,426.

*To all whom it may concern:*

Be it known that I, ALLEN A. HORTON, a citizen of the United States, residing at Detroit, county of Wayne, State of Michigan, have invented a certain new and useful Improvement in Driving Apparatus for Phonographs, and declare the following to be a full, clear, and exact description of the same, such as will enable others skilled in the art to which it pertains to make and use the same, reference being had to the accompanying drawings, which form a part of this specification.

This invention relates to driving apparatus for maintaining a constant predetermined speed, and is especially adapted for driving phonograph records.

Figure 1:
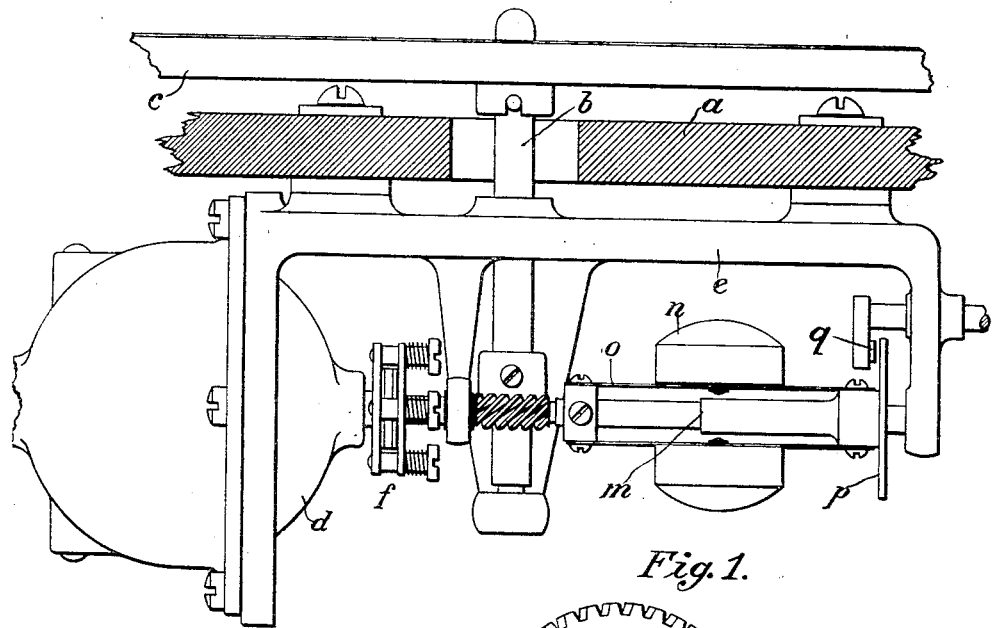
Figure 2:
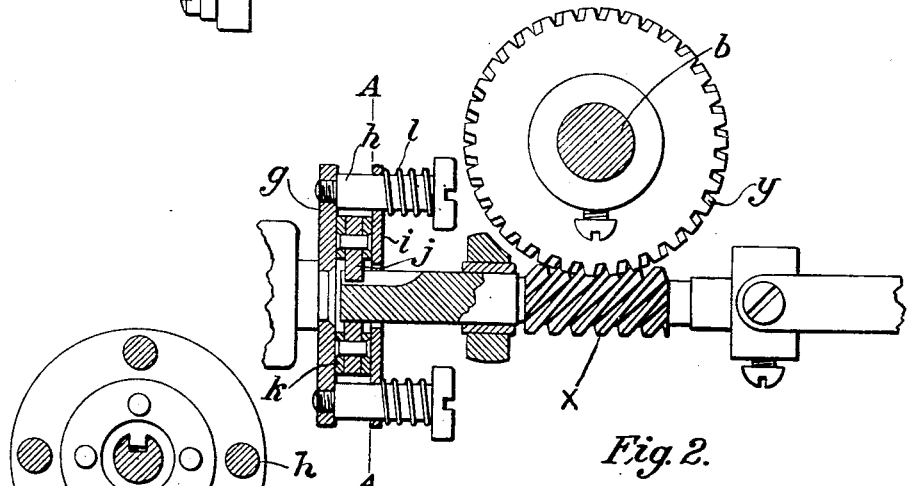
Figure 3:
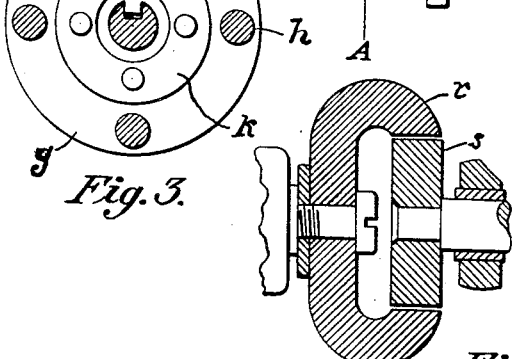
Figure 4:
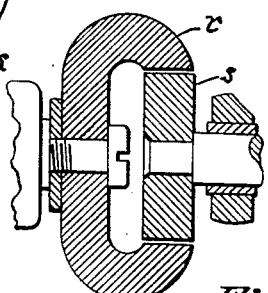

In the drawings, Figure 1 is a side elevation of the apparatus showing it attached to a phonograph stand. Fig. 2 is a horizontal cross section through the clutch, drive shaft and the drive connections between the drive shaft and the phonograph spindle. Fig. 3 is a cross section on the line A—A of Fig. 2. Fig. 4 is a longitudinal section of a form of clutch, of the magnetic type.

The phonograph housing or box is lettered $a$, the driving spindle $b$, the revolving table $c$.

$e$ designates a suspended frame which carries the motor and drive connections.

$d$ represents the motor.

$x$ designates a worm on the driven shaft and $y$ a helical gear on the driving spindle $b$.

$f$ designates the disk clutch shown in detail in Fig. 2 and comprising a disk $g$ fast to the driving member and provided with a plurality of pins $h$ upon which slides the movable disk $i$. Upon the driven shaft is splined a disk $j$ which is provided on either side with friction rings $k$ preferably made out of leather or other substances having a large coefficient of friction.

It will be noted that the movable disk $i$ of the driving member is yieldingly forced against the movable disk $j$ of the driven member by reason of the coiled springs $l$ which engage around the pins $h$. The consequence of this clutch arrangement is that these springs are always tending to press the movable disk $i$ against the movable disk $j$ and consequently the movable disk $j$ is yieldingly pinched between the driving disks $g$ and $i$. This, therefore, forms a multiple disk clutch with a limited number of disks so it may easily slip when subjected to sudden changes of load due to acceleration.

Now, the sudden changes of load due to acceleration is accomplished by the use of a governor shown in Fig. 1. An extension of the driven shaft is divided into two parts which are telescoped as indicated at $m$. These telescoped shaft parts may slide easily on each other and this sliding is accomplished by the throwing out of the weights $n$ which are attached by thin leaf springs $o$ to the two shaft parts. It will, therefore, be easily understood that when the machine accelerates beyond a given speed the weights throw out and the right hand shaft part is drawn toward the left hand shaft part, bringing the friction disk $p$ in contact with the friction point $q$. With the customary construction heretofore in use, the only speed reducing means has been this friction between the friction disk and the friction point.

I am also aware that it has been proposed to utilize the governor to operate one of the clutch parts and eliminate this load producing friction device. However, the load producing device alone is objectionable for the reason that it throws all the increased load upon the motor, thereby attempting to make the speed constant by retarding the motor itself. The single clutch operated by the governor is objectionable for the reason that the operation of the governor must needs produce a sudden reduction of speed by drawing the clutch parts away from each other.

My clutch parts are never drawn away from each other but are so stressed by the springs that when subjected to an unusual load, they slip, that is to say, when the friction disk is drawn into engagement with the friction point by the operation of the governor, the load is thereby increased. The clutch parts will now slip and the motor itself can run at the increased speed due to current changes, but the shaft itself will be driven at a constant speed due to the slippage of the clutch parts.

In Fig. 4 I have shown a magnetic form of clutch in which $r$ is the permanent magnet and $s$ is an armature which will ordinarily rotate with the permanent magnet except when subjected to increased load due to the contact of the friction disk $p$ with the friction point $q$.

What I claim is:

1. In driving apparatus for phonographs, the combination of a drive shaft, a driven shaft, load producing apparatus connecting with the latter for increasing the load when the shaft accelerates beyond a given speed, and a spring actuated clutch interposed between the drive shaft and the driven shaft, the clutch parts being so stressed as to maintain a uniform speed for the driven shaft although the drive shaft speeds up, such uniform speed being accomplished by the clutch parts slipping due to increased load due to the load producing apparatus.

2. In driving apparatus for phonographs, the combination of a drive shaft, a driven shaft, load producing apparatus connecting with the latter for increasing the load when the driven shaft is accelerated above a given speed, and a clutch interposed between the drive shaft and the driven shaft and comprising a plurality of disks yieldingly pressed against each other by a force calculated to allow a certain amount of slippage of the disks when the drive shaft accelerates above a given speed to secure uniformity of speed of the driven shaft.

3. In phonograph driving apparatus, the combination of a drive shaft, a driven shaft, the latter of which is divided into two parts which telescope, a friction disk on the movable telescoping part, a governor for controlling the sliding of the telescoping parts, a friction point against which the friction disk may be brought, and a clutch interposed between the drive shaft and the driven shaft and calculated to slip to a certain extent when the governor throws the friction disk and friction point together to increase the load on the driven shaft, such slippage being calculated to secure uniform speed for the driven shaft.

4. In driving apparatus for phonographs, the combination of a drive shaft, a driven shaft, load producing apparatus connected directly with the driven shaft for varying the load upon the driven shaft in accordance with the speed thereof, and a clutch connection between the drive shaft and the driven shaft, the said clutch parts being maintained in such frictional engagement as to avoid the transmission of sudden changes of speed from the driven shaft to the drive shaft and also to maintain uniformity of speed of the driven shaft by reason of a certain amount of slippage at the clutch when the load producing apparatus increases the load when there is a tendency to accelerate.

In testimony whereof I sign this specification.

ALLEN A. HORTON.